W. R. HARTUNG.
GEARING FOR GRAIN DRILLS.
APPLICATION FILED JAN. 15, 1919.
1,329,901.
Patented Feb. 3, 1920.
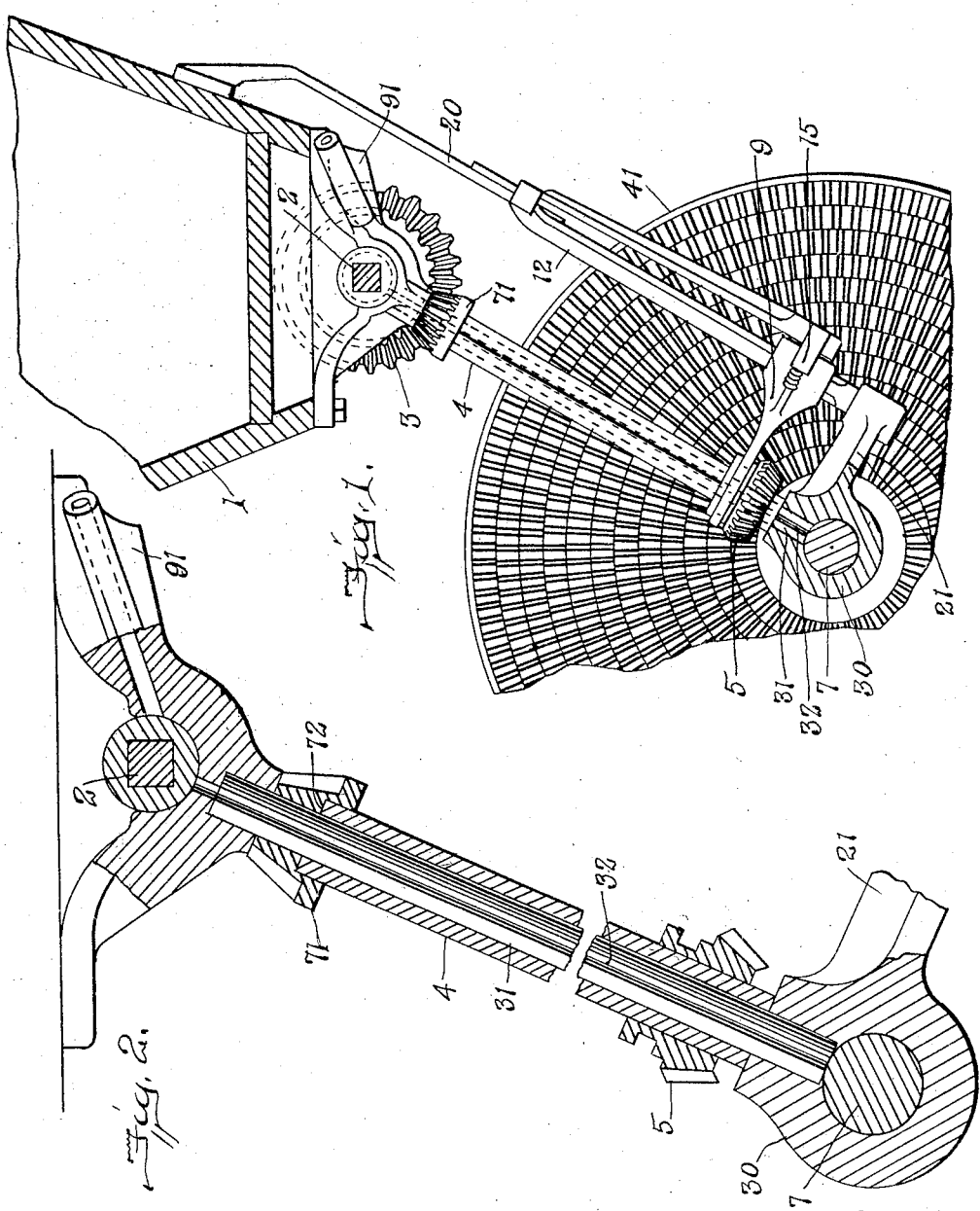
Inventor
William R. Hartung,
By Toulmin & Toulmin,
Attorneys

UNITED STATES PATENT OFFICE.

WILLIAM R. HARTUNG, OF CONNELL, WASHINGTON, ASSIGNOR TO THE THOMAS MANUFACTURING COMPANY, OF SPRINGFIELD, OHIO, A CORPORATION OF OHIO.

GEARING FOR GRAIN-DRILLS.

1,329,901.  Specification of Letters Patent.  Patented Feb. 3, 1920.

Application filed January 15, 1919. Serial No. 271,195.

*To all whom it may concern:*

Be it known that I, WILLIAM R. HARTUNG, a citizen of the United States, residing at Connell, in the county of Franklin and State of Washington, have invented certain new and useful Improvements in Gearing for Grain-Drills, of which the following is a specification, reference being had therein to the accompanying drawing.

This invention relates to gearing for grain drills and aims to improve the construction of prior patents owned by applicant's assignee, No. 700,231, May 28, 1902, and No. 736,436, Aug. 18, 1903, and is a further improvement of the construction shown in the pending application for patent of C. H. Pelton, filed Nov. 10, 1917, Ser. No. 201,265.

In these prior patents there is shown a change gearing for grain drills in which a distributer shaft is connected to a driving axle through a connecting shaft having pinions mounted thereon, these pinions meshing respectively with the gears on the driving axle and the distributer shaft. The construction of the patents has been generally satisfactory in commercial use but it has been found that in some cases the extent of bearing or journal surface was not sufficient and an occasional breakage of parts resulted.

Therefore, it is an object of the present invention to provide a simple and effective construction of the connections referred to not liable to wear or breakage and easily oiled and kept in good condition.

In the improved form of construction a supporting shaft is provided having its opposite ends rigidly secured in the bearings supporting respectively the distributer shaft and the driving axle. Telescoped upon the shaft is a sleeve having rigidly secured to one end thereof a pinion meshing with a gear on the distributer shaft, and a pinion slidably secured to the other end thereof and meshing with a change gear carried by the driving axle. Thus the driving connection between the axle and the distributer axle is strengthened and supported by the rigid shaft extending between the bearings and wear and possible breakage are thereby minimized.

Referring to the drawings, Figure 1 shows a side elevation of a grain drill hopper and the mechanism of the invention applied thereto; and Fig. 2 is an enlarged detail view of the supporting shaft and associated parts, the view being in vertical section.

Referring to the drawings the parts of the invention generally are shown as nearly similar to the corresponding parts of the patents referred to. The grain hopper 1 carries the distributer shaft 2 by means of a bearing block 91, which block may be fastened to the bottom of the hopper in any desired way. As a preferred form the construction shown in the earlier of the two patents referred to may be employed. The distributer shaft 2 is shown as square in cross section and has splined thereon a bevel gear 3 which drives it. The driving axle 7 is supported in a journal or housing 30 and fastened to this axle is a change gear 41, as shown in the prior patents. A connecting sleeve 4 carries a bevel gear 5 near its lower end and a bevel gear 71 near its upper end, the gear 5 being adapted to be driven by the change gear 41 and the gear 71 meshing with and driving the gear 3 on the distributer shaft. Thus, the movement of the vehicle rotates the driving axle 7 and the change gear 41 and thus operates the distributer shaft 2 in the desired manner.

To cause different speeds of rotation of the distributer shaft the bevel gear 5 is splined to the connecting sleeve 4 and is moved along this shaft by a yoke 9, the yoke being slidable along a rod 12 supported by an extension 21 of the journal 30 at its lower end and fastened to the grain hopper 1 at its upper end through an intervening indicator section 20. As the yoke 9 is moved up and down along the rod 12 the bevel pinion or gear 5 is correspondingly elevated and thus the ratio of speed of shaft 2 to axle 7 is changed. In order to maintain the bevel gear 5 in the desired position a spring latch 15 is employed.

The parts thus far described are substantially those found in the prior patents and the invention of the present application will be next described.

It has been found by long usage that when the bearing plate 91 and the axle journal 30 were bored to provide journals for the connecting shaft 4, in some cases an insufficient amount of bearing surface was provided because of the rough and hard usage which such devices as grain drills received. In order to improve this part of the construction the present invention provides a shaft 31 extending between the bearings 91 and 30, as clearly shown in Fig. 2. It will be seen that the bearing plate 91 provides an elongated housing in which the upper end of the connecting shaft 31 is secured.

This sleeve 4 is shown as polygonal in cross section, but may be of any desired shape. The upper bevel pinion 71 is provided with a polygonal aperture at its lower end closely surrounding the upper end of the sleeve 4 and this upper end of the sleeve 4 abuts against a portion 72 of the gear 71.

Similarly the journal or housing 30 surrounding the driving axle 7 supports the opposite end of shaft 31, the shaft extending a considerable distance into the housing. The bevel pinion 5 is splined to the sleeve 4, as before stated, and when the shaft 4 is polygonal in cross section this may be done by providing the bevel pinion 5 with a similarly shaped central aperture.

Thus it will be seen that the shaft 31 acts to hold the distributer shaft in fixed relation to the driving axle and to strengthen and support the connecting driving mechanism throughout its entire length. The ends of the shaft being rigidly secured in the bearing housings there is no tendency of the parts to move out of adjustment, and wear and breakage of the parts is rendered negligible. To minimize friction between the shaft and sleeve 4 the shaft is provided with a groove 32 by means of which oil may be supplied to the working surfaces.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. The combination with the axle and feed shaft of a grain drill having gears secured thereto, respectively, bearings supported relative to said shafts, each having a bearing projection alined with a corresponding projection of the opposite bearing, a shaft secured in said bearing projections and extending therebetween, a sleeve rotatable on said shaft and having pinions at the opposite ends thereof meshing respectively with said gears.

2. The combination with a geared driving shaft and a geared feed shaft of a grain drill, of bearings for said shafts having alined projections extending between said shafts, a shaft fixed in said projections, a geared sleeve rotatable on the fixed shaft and coöperating with said geared shafts, whereby movement may be transmitted from the driving shaft to the feed shaft.

3. The combination with the driving axle of a grain drill having a change gear, of a feed shaft having a gear, bearings for said shafts having alined angularly inclined projections extending therebetween, a fixed shaft extending substantially between the axle and the feed shaft and having its ends secured in said projections, a sleeve rotatable on the fixed shaft and having a gear fixed thereto meshing with the gear on the feed shaft and a gear adjustably secured thereto meshing with said change gear, whereby variable movement may be imparted to the feed shaft.

In testimony whereof I affix my signature.
WILLIAM R. HARTUNG.